(Model.)

J. T. WALKER.
PACKING CAN.

No. 291,557. Patented Jan. 8, 1884.

WITNESSES
Edwin L. Yerrill
William C. Alexander

INVENTOR
James T. Walker,
By C. M. Alexander
Attorney

UNITED STATES PATENT OFFICE.

JAMES T. WALKER, OF BALTIMORE, MARYLAND.

PACKING-CAN.

SPECIFICATION forming part of Letters Patent No. 291,557, dated January 8, 1884.

Application filed March 14, 1883. (Model.)

*To all whom it may concern:*

Be it known that I, JAMES T. WALKER, a citizen of the United States, residing at Baltimore, in the county of Baltimore and State of Maryland, have invented certain new and useful Improvements in Packing-Cans, of which the following is a specification, reference being had therein to the accompanying drawings.

My invention relates to certain improvements in cases for packing fruits, vegetables, meat, and other like perishable articles, and has for its object to provide a suitable method for hermetically packing edibles in metallic cases, whereby the heads are securely held in place, and no vapor or steam can interfere with the entrance of the solder into the joints and no solder can come in contact with the edibles in the case. This method is applicable to those classes of goods which are packed while cool, but is especially adapted to those which are packed while hot enough to generate vapor or steam sufficient to blow the solder.

Figure 1:
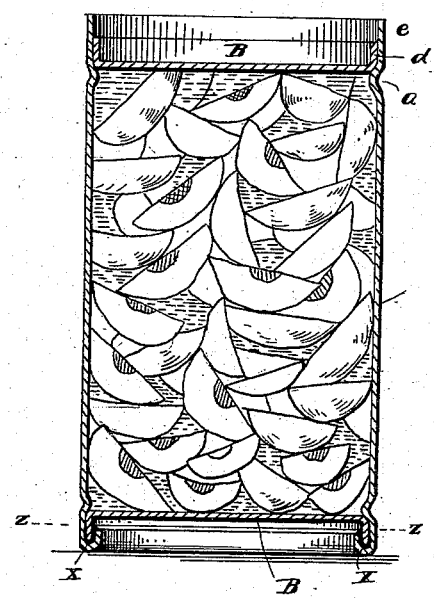
Figure 2:
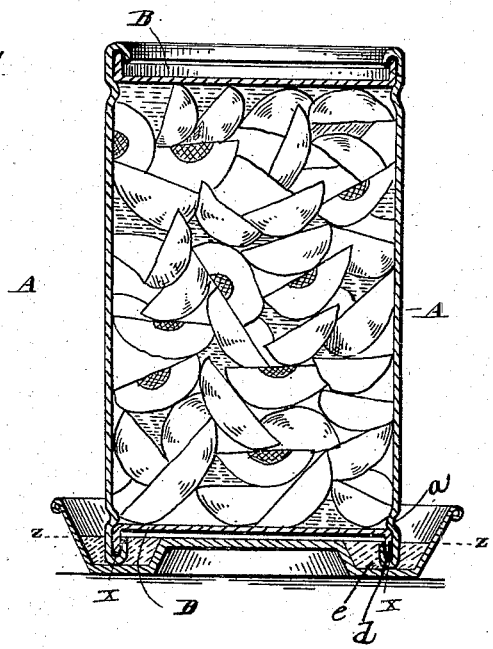
Figure 3:
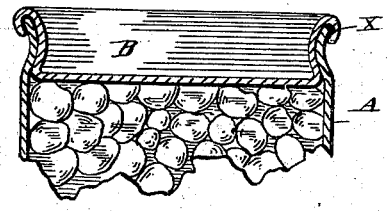
Figure 4:
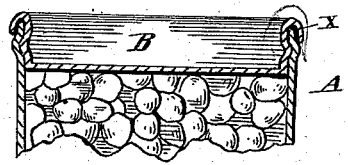
Figure 5:
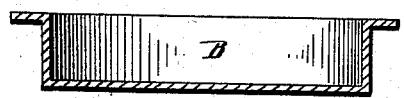

In the accompanying drawings, Figure 1 represents a longitudinal vertical section of my case having one end already soldered, the fruit or edibles filled in, and the head placed in position to be manipulated to fit it for soldering. Fig. 2 represents a similar view, showing the chine of the case and the flange of the head interlocked and the case inverted, so that its interlocked parts can receive solder into its joints when immersed in a solder bath. Figs. 3 and 4 represent modifications of my method of interlocking the parts of the case and head, and Fig. 5 shows a cross-section of the head and its flange.

As I prefer the construction represented in Figs. 1 and 2, I will proceed to described them with their interlocking parts and my mode of manipulating the same.

In the figures, A represents the can, which is made in any of the usual sizes and of the usual material. Around the inner surface of this can and near the ends is formed a bead of sufficient width to form a secure bearing for the head which is to rest upon it. From these beads outward will be seen the chines of the can, marked *e e*. In cans of large size these chines will be or may be made three-quarters of an inch long.

B B represent the two imperforate heads of the can. These heads are formed with outwardly-projecting annular flanges *d d*, which are made about one-half an inch in length. The heads are made to fit snugly within the ends of the can and to rest, as represented, upon the beads *a a*. When the heads are in their places, the ends of their flanges fall short of the ends of the chines about one-quarter of an inch, so that the chines may be turned or bent over the flanges, thus forming a lap-joint for the reception of solder. After the chine has been turned or lapped over the flange, the end of the chine will be about a quarter of an inch from the inner face of the head, and consequently from the contents of the can, thus leaving a joint sufficiently remote from the contents to insure the taking of the solder for hermetically sealing. After one head has been placed and soldered in position, the can is filled with its contents. The other head is then pressed into position, as seen in the figure, and the chine is turned or lapped over its flange. This having been done, the can is inverted and dipped into solder to the depth of about the line *z z*. As soon as the can is inverted, all air or vapor which may be left in will at once rise to the top, thus leaving no steam or vapor to interfere with the entrance of the solder to the joint. By this means cans can be very cheaply made and always with absolute certainty that they will be hermetically sealed, for when they are dipped in the solder the joint is submerged and subjected to is action at every point simultaneously, and that, too, without danger of being interfered with by anything which the can may contain.

Consistent with my improvement in the state of the art of hermetically sealing vessels, the chines may be bent over the flanges, or the flanges may be bent over the chines, the two being securely interlocked in a plane remote from the plane of the head, as in both instances the interlocked parts will be in position to be soldered in the manner hereinbefore described.

Having thus fully described my invention, what I claim, and desire to secure by Letters Patent, is—

1. In the art of hermetically packing edibles or perishable substances in metallic vessels, the following method, consisting in first filling the vessel, then applying to same an imperforate flanged head, then interlocking the chines of the body and the flanges of the head, then inverting the vessel, and while inverted soldering the interlocked parts, substantially as and for the purpose set forth.

2. The within-described method of hermetically packing substances in metallic cans or vessels, namely: first filling the vessel, then applying an imperforate flanged head to same, then interlocking the chine and the flange of the head by bending one over the other, leaving the overlap apart from the plane of the head, and then dipping the interlocked portion of chine and flange in solder, substantially as and for the purpose set forth.

In testimony whereof I affix my signature in presence of two witnesses.

JAMES T. WALKER.

Witnesses:
CHAS. D. DAVIS,
H. J. ENNIS.